US011560129B2

(12) United States Patent
Jost et al.

(10) Patent No.: US 11,560,129 B2
(45) Date of Patent: Jan. 24, 2023

(54) METHOD FOR OPERATION OF A BRAKE BACK-UP SYSTEM OF A MOTOR VEHICLE

(71) Applicant: Ford Global Technologies, LLC, Dearborn, MI (US)

(72) Inventors: Gabrielle Jost, Niederzier (DE); Ahmed Benmimoun, Aachen (DE); Jeffrey Tumavitch, Livonia, MI (US); Bradley D. Riedle, Northville, MI (US); Steve Cicala, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 638 days.

(21) Appl. No.: 16/655,740

(22) Filed: Oct. 17, 2019

(65) Prior Publication Data
US 2020/0122707 A1 Apr. 23, 2020

(30) Foreign Application Priority Data
Oct. 18, 2018 (DE) .......................... 102018217884.4

(51) Int. Cl.
*B60T 17/22* (2006.01)
(52) U.S. Cl.
CPC ......... *B60T 17/22* (2013.01); *B60T 2270/402* (2013.01); *B60T 2270/404* (2013.01)
(58) Field of Classification Search
CPC ............... B60T 17/22; B60T 2270/402; B60T 2270/404
USPC .......................................................... 701/70
See application file for complete search history.

(56) References Cited

U.S. PATENT DOCUMENTS

| 6,139,117 A * | 10/2000 | Shirai .................. B60T 13/741 188/1.11 R |
| 9,605,751 B2 * | 3/2017 | Bertollini ................ F16H 59/74 |
| 2002/0007979 A1 * | 1/2002 | Wilson .................. F16H 59/044 180/312 |
| 2003/0141130 A1 * | 7/2003 | Fleming .................. F16H 61/22 180/271 |

(Continued)

FOREIGN PATENT DOCUMENTS

| DE | 102015118290 A1 * | 4/2017 | ............ B60T 11/102 |
| DE | 102017201982 A1 * | 8/2018 | ............ B60T 13/662 |

(Continued)

OTHER PUBLICATIONS

Jin-Oh et al., "Fault Diagnostics in the Differential Brake Control System Using the Analytical Redundancy Technique," 2003, vol. 3, Publisher: IEEE.*

(Continued)

*Primary Examiner* — Tuan C To
(74) *Attorney, Agent, or Firm* — Frank Lollo; Eversheds Sutherland (US) LLP

(57) ABSTRACT

The invention concerns a method for operating a brake back-up system (8) of a motor vehicle (2), with the steps:
(S100) Reading in operating data (BD) of the motor vehicle (2),
(S200) Evaluating the read-in operating data (BD) to identify malfunctions of a braking system of the motor vehicle (2), and
(S300) Providing at least one actuation signal (AS, AS') to influence components of a drive train of the motor vehicle (2).

11 Claims, 4 Drawing Sheets

(56) References Cited

U.S. PATENT DOCUMENTS

| | | | |
|---|---|---|---|
| 2007/0278856 A1* | 12/2007 | Craig | B60T 13/588 |
| | | | 303/3 |
| 2008/0086252 A1* | 4/2008 | Nakayama | B60T 7/122 |
| | | | 701/80 |
| 2014/0129098 A1* | 5/2014 | Ohbayashi | F02D 29/02 |
| | | | 701/51 |
| 2014/0129108 A1* | 5/2014 | Grieser-Schmitz | B60T 8/885 |
| | | | 701/70 |
| 2015/0175144 A1* | 6/2015 | Watanabe | B60T 17/18 |
| | | | 303/10 |
| 2015/0291135 A1* | 10/2015 | Vernacchia | B60T 7/122 |
| | | | 701/70 |
| 2018/0162341 A1* | 6/2018 | Irwan | B60T 13/686 |
| 2018/0186353 A1* | 7/2018 | Lee | B60T 13/166 |
| 2019/0168724 A1* | 6/2019 | VandenBerg, III | B60T 8/885 |
| 2019/0299955 A1* | 10/2019 | Szabela | B60T 7/22 |

FOREIGN PATENT DOCUMENTS

| | | | | |
|---|---|---|---|---|
| EP | 1424255 A1 * | 6/2004 | | B60T 13/66 |
| WO | WO-2018172233 A1 * | 9/2018 | | B60T 13/66 |

OTHER PUBLICATIONS

A.D. et al., "A Backup System for Automotive Steer-by- Wire, Actuated by Selective Braking", 2004, vol. 1, Publisher: IEEE.*

* cited by examiner

METHOD FOR OPERATION OF A BRAKE BACK-UP SYSTEM OF A MOTOR VEHICLE

CROSS-REFERENCE TO RELATED APPLICATIONS

This application claims priority to and the benefit of German patent application No. 102018217884.4, filed Oct. 18, 2018, which is hereby incorporated by reference herein in its entirety.

The invention concerns a method for operating a brake back-up system of a motor vehicle.

The vehicle can have a driver assistance system providing a remote-controlled und/or automatic driving function.

Advanced Driver Assistance Systems (ADAS) are electronic auxiliary devices in motor vehicles for assisting the driver in certain driving situations. Safety aspects are often at the forefront, but also the increase in driving comfort.

Some of the driver assistance systems provide a remote-controlled und/or automatic driving function, such as for example a remote park assistant, a valet parking assistant or a remote trailer back-up assistant.

A remote park assistant (RePA) allows a driver to maneuver a motor vehicle in or out of a parking space while outside the motor vehicle by means of a handheld device such as a smartphone or tablet. This is convenient and especially helpful when the parking space is very small. The driver and other passengers can easily open the driver's door or other vehicle doors outside the parking space without damaging neighboring vehicles or dirtying their clothing. The ability to observe the motor vehicle from the outside during the parking process provides an added benefit.

A valet parking assistant, on the other hand, allows automatic parking of a self-driving motor vehicle.

A remote trailer back-up assistant, on the other hand, allows you to park a vehicle combination consisting of a motor vehicle with a trailer.

In order to ensure the safety of the motor vehicle and its surroundings, there should be a permanent data connection between the motor vehicle and the handheld device. The driver can move the motor vehicle by making an input on a handheld device used as a smart remote device (SRD). This allows the driver to stop the vehicle immediately if he so wishes or if necessary.

If the braking system fails during the maneuvering of the motor vehicle with the handheld device, e.g. due to a fault of the control unit, the braking system is not able to stop the motor vehicle in such cases. Furthermore, the driver cannot stop the motor vehicle by means of a brake pedal operation because he is outside the motor vehicle. The vehicle would then accelerate uncontrollably, especially on sloping surfaces. A change to a park mode of an automatic transmission would not be possible in such a situation, as this is only possible up to a motor vehicle speed of up to about 4 km/h. When the braking performance of the motor vehicle's brakes deteriorates during maneuvering on sloping surfaces, the motor vehicle accelerates too quickly to enter the park mode of the automatic gearbox below the aforementioned threshold for the vehicle speed.

Even during normal operation of a motor vehicle with a brake by wire system, there may be a failure of the braking system. Normal operation is understood to mean that a driver is in the motor vehicle and is controlling it, thus no driver assistance system is in control of the motor vehicle.

It is therefore the object of the invention to provide a method by which the vehicle can be brought to a standstill even if the braking system fails.

The object is achieved by a method for operating a brake back-up system of a motor vehicle, with the steps:
Reading in operating data of the motor vehicle,
Evaluating the read-in operating data to identify malfunctions of a motor vehicle braking system, and
Providing an actuation signal to influence components of a drive train of the motor vehicle.

Operating data of the motor vehicle are therefore read in and evaluated that could be indicative of a failure of the braking system of the motor vehicle. If this is the case, selected components of the drive train are actuated to provide a braking effect in an alternative way to stop or bring the motor vehicle to a halt. This can increase the safety of such a driver assistance system or brake-by-wire system.

According to one embodiment, a traction engine of the motor vehicle as a component of the drive train is actuated with the actuation signal in such a way that the traction engine provides torque that causes a standstill of the vehicle. The drive train of the motor vehicle is understood as all components that generate the torque for the drive in the motor vehicle and transfer it to the road. With a conventional drive train, in which a combustion engine is used, such as a petrol or diesel engine, said components include the traction engine with the flywheel (if necessary as a dual mass flywheel), the clutch with the automatic transmission, with multi-track vehicles the differential, the drive shafts or floating axles as well as the wheels. The drive train can also comprise an electric motor or a combination consisting of a combustion engine and an electric motor. In other words, the traction engine provides a compensation force or a compensation torque to provide a braking moment and thus to stop the motor vehicle. In addition, a compensation force or a compensation torque can be provided to reduce the vehicle speed to a value smaller than a reference value. The size of the reference value is representative of the fact that the vehicle can then be stopped in a park mode of an automatic transmission of the motor vehicle.

According to this embodiment, an automatic transmission as a component of the drive train of the motor vehicle is actuated with a further actuation signal in such a way that a torque acting oppositely to the direction of movement of the motor vehicle is provided. In order to stop a movement in the forward direction, a reverse gear is selected and in the case of a movement in the reversing direction the first or another gear is selected.

According to a further embodiment, a control signal is generated to switch to a park mode of an automatic gearbox of the motor vehicle on detecting a standstill of the motor vehicle. A detected standstill can also be understood to mean that the speed of the motor vehicle is below a predetermined threshold.

According to a further embodiment, a clutch assembly of the motor vehicle as a component of the drive train is actuated with the actuation signal in such a way that drive wheels of the motor vehicle lock. An alternative braking effect can thus be provided to stop the vehicle. It may also be envisaged to provide a braking effect in a second phase by locking the drive wheels after a braking effect has been provided in a first phase by other means, for example by actuating the traction engine. In other words, an additional braking effect is provided with a time offset.

According to a further embodiment, inadmissible data and/or a speed of the motor vehicle above a threshold are identified as malfunctions. Inadmissible data can be too low a brake pressure or too low a brake fluid level. Furthermore, the malfunction may be a speed of the motor vehicle above a threshold that is caused by an uncontrolled acceleration of the motor vehicle.

According to a further embodiment, data representative of brake actuation signals and/or of a motor vehicle speed are used as operating data. The brake actuation signals are used to activate the vehicle brakes of the motor vehicle. Data representative of a motor vehicle speed of the motor vehicle allow unwanted accelerations of the motor vehicle to be detected.

The invention also includes a computer program product for carrying out such a method, a brake back-up system and a motor vehicle with such a brake back-up system.

The invention is now described using a drawing. In the figures.

Figure 1:
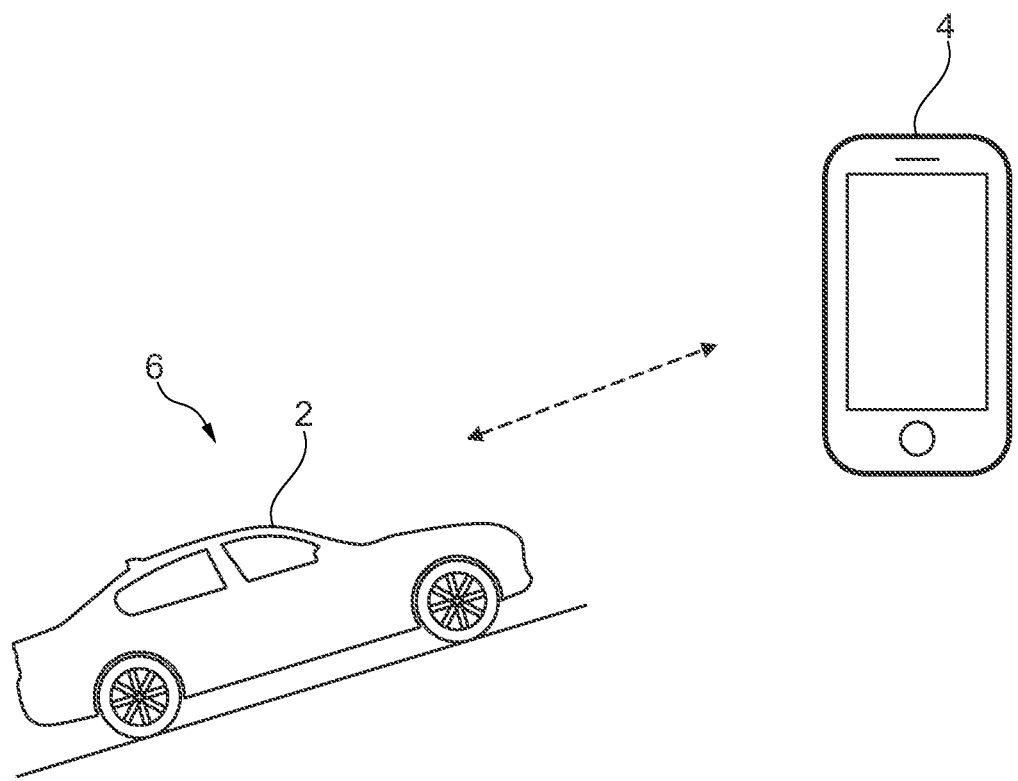
FIG. 1 shows in a schematic representation a scenario in which a motor vehicle is parked with the help of a driver assistance system and a brake back-up system associated with the driving assistance system.

Referring first to FIG. 1.

A scenario is shown in which a driver is parking a motor vehicle 2 into a parking space or alternatively is unparking the motor vehicle 2.

The motor vehicle 2 is a passenger car in this exemplary embodiment. In addition, the motor vehicle 2 comprises a driver assistance system 6, with which the driver can maneuver the motor vehicle 2 into and/or out of the parking space using a handheld device 4, wherein the driver is outside the motor vehicle 2.

In other words, the driver assistance system 6 is embodied as a 6 in this exemplary embodiment. In a difference from the present exemplary embodiment, the driver assistance system 6 can also provide other remote-controlled and/or automatic driving functions for which the driver is outside the motor vehicle 2, such as a valet parking assistant or a remote trailer back-up assistant.

To maneuver the motor vehicle 2, a wireless data transmission connection is established between the driver assistance system 6 and the handheld device 4, such as a radio connection with limited range, such as a Bluetooth connection with a few meters range, for example. Thus, inputs made by the driver on the handheld device 4 can be converted into control signals and transferred to the motor vehicle 2, which then implements them.

The handheld device 4 is a portable electronic device with a power supply by means of storage batteries or batteries for different applications. It is so small and lightweight that it can be held in just one hand when in use. It can be a smartphone or a tablet computer, for example.

In this exemplary embodiment, the motor vehicle 2 is located on a sloping surface.

If a braking system of the motor vehicle 2 now fails during maneuvering, e.g. due to a fault of the control unit, the motor vehicle 2 cannot be stopped in such cases, as the driver is outside the motor vehicle 2 and therefore the motor vehicle 2 cannot be stopped by brake pedal operation. In addition, the motor vehicle 2 accelerates in the reversing direction due to the sloping surface.

This can cause the motor vehicle speed to assume values above about 3 km/h, at which the motor vehicle 2 is maneuvered. A change to a park mode of an automatic transmission to stop the motor vehicle 2 is all the more impossible in such a situation, as this is only possible up to a motor vehicle speed of about 4 km/h.

Figure 2:
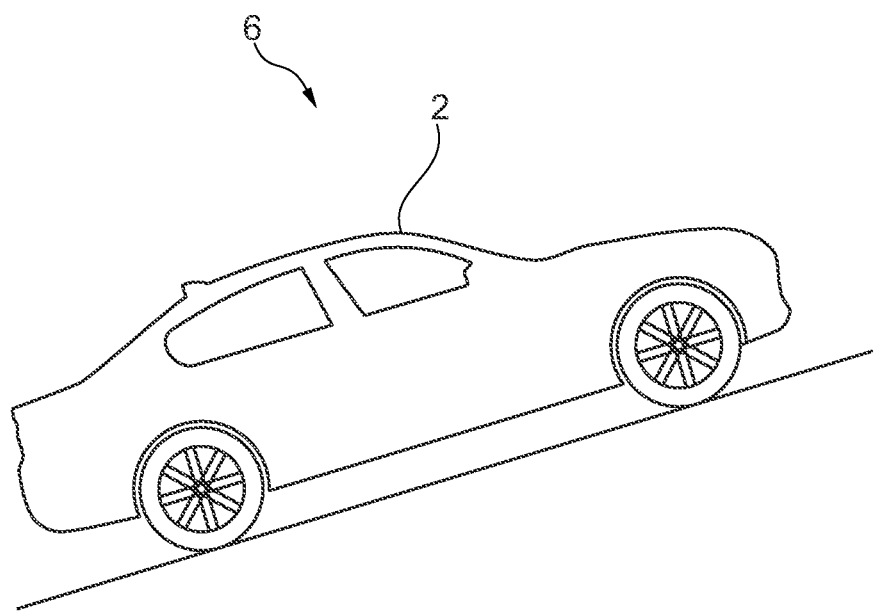
FIG. 2 shows in a schematic representation a scenario in which a motor vehicle is controlled by a driver.

Now referring additionally to FIG. 2.

The scenario represented in FIG. 2 differs from the scenario represented in FIG. 1 in that a driver is in the motor vehicle 2 and is controlling the vehicle or a driver assistance system 6 has control of the motor vehicle 2.

The motor vehicle 2 has a brake-by-wire braking system, in which a brake pedal operation by the driver is converted into an electric braking demand signal, which then actuates the respective brakes of the brake-by-wire braking system. There is no mechanical or hydraulic connection between a brake pedal and the respective brakes of the braking system.

Even with normal operation, there may be a failure of the braking system. Due to the sloping surface, a failure of the braking system causes the motor vehicle 2 to accelerate in the reversing direction.

Figure 3:
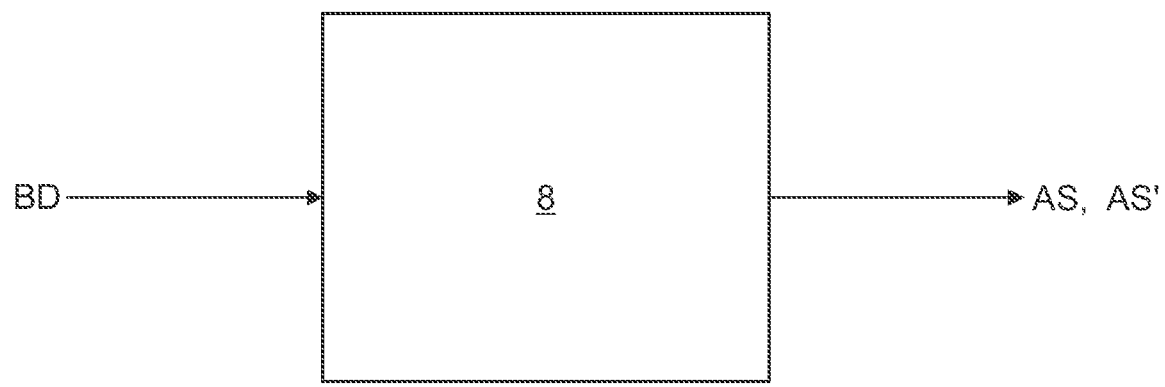
FIG. 3 shows in a schematic representation more details of the brake back-up system.

To increase safety, the motor vehicle 2 comprises a brake back-up system 8, which is described with additional reference to FIG. 3.

The brake back-up system 8 is as is explained in detail later—designed to read in operating data BD of the motor vehicle 2, to evaluate the read-in operating data BD in order to identify malfunctions of a braking system of the motor vehicle 2 and to provide at least one actuation signal AS, AS' to influence components of a drive train of the motor vehicle 2.

The brake back-up system 8 has hardware and/or software components for the tasks and functions thereof that are described below.

Figure 4:
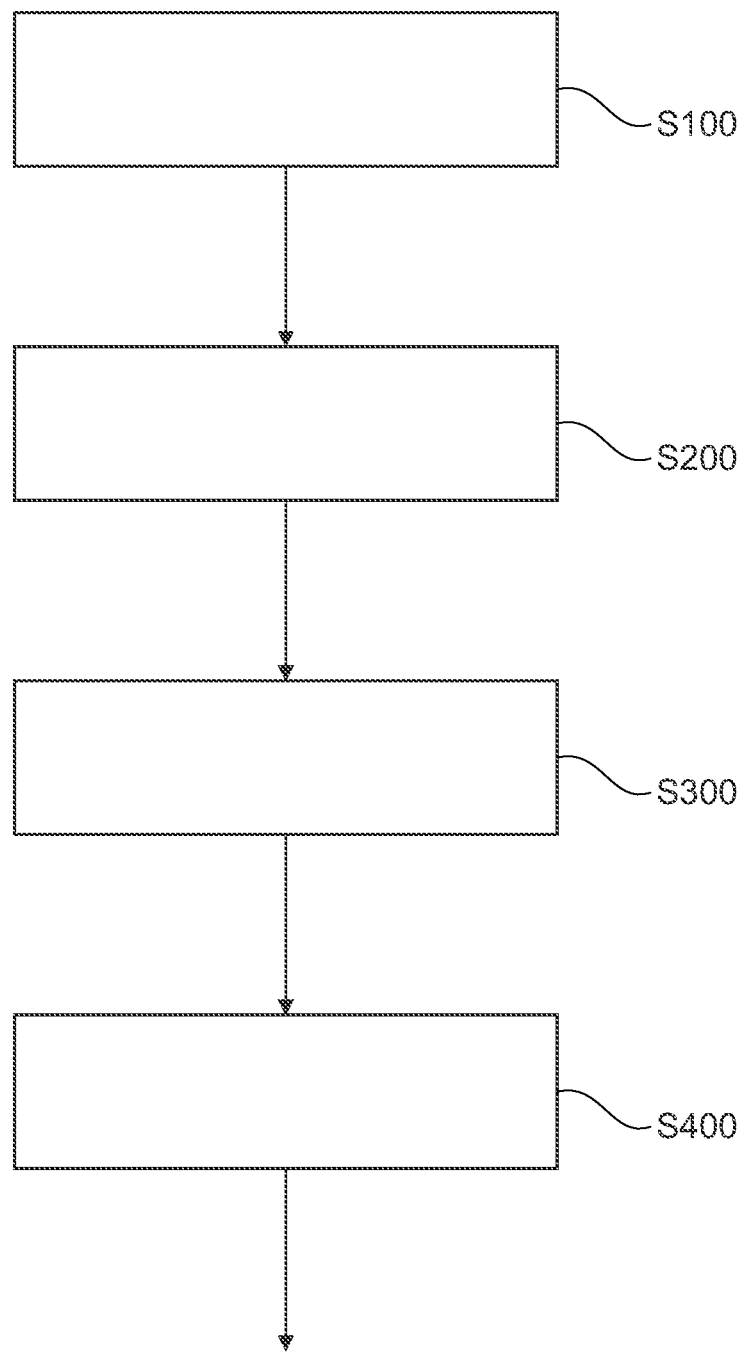
FIG. 4 shows in a schematic representation a process diagram of the operation of the brake back-up system shown in FIG. 3.

A process diagram of the operation of the brake back-up system 8 is now described with additional reference to FIG. 4.

The brake back-up system 8 is designed to read in operating data BD of the motor vehicle 2 in a first step S100, e.g. via a CAN bus of the motor vehicle 2, after commissioning of the driving assistance system 6.

In the present exemplary embodiment, the operating data BD can be representative of brake actuation signals for activating the vehicle brakes of the motor vehicle 2 or data representative of a motor vehicle speed of the motor vehicle 2.

In a second step S200, the brake back-up system 8 evaluates the read-in operating data BD to identify malfunctions of the braking system of the motor vehicle 2. The occurrence of a malfunction is considered indicative of a failure of the braking system of the motor vehicle 2.

The malfunctions may be inadmissible data, such as too low a brake pressure or too low a brake fluid filling level, indicating a malfunction of the braking system 2. Furthermore, the malfunction can be a speed of the motor vehicle above a threshold. The threshold can be, for example, at a motor vehicle speed of 4 km/h, wherein when maneuvering with the driver assistance system 6 only motor vehicle speeds of a maximum of 3 km/h are achieved. Thus, this can be considered indicative of an uncontrolled acceleration of the motor vehicle 2.

In a further step S300, the brake back-up system 8 provides an actuation signal AS to influence components of a drive train of the motor vehicle 2. The drive train of the motor vehicle 2 is understood to be all components that generate the torque for the drive in the motor vehicle 2 and transfer the torque to the road. With a conventional drive train, in which a combustion engine, such as a petrol or diesel engine, is used, said components include the traction engine with the flywheel (if necessary as a dual mass flywheel), the clutch with the vehicle transmission, with multi-track motor vehicles the differential, the drive shafts or floating axles as well as the wheels. In a difference from the present exemplary embodiment, the drive train may also comprise an electric motor or a combination consisting of a combustion engine and an electric motor, i.e. a hybrid drive.

With the actuation signal AS, the traction engine of the motor vehicle 2 can be actuated in such a way that the traction engine provides a torque causing a standstill of the motor vehicle 2. In other words, the traction engine provides a compensation force or torque to compensate forces acting on and accelerating the motor vehicle 2 to zero or to provide a braking moment and thus to stop the vehicle 2. Furthermore, a compensation force or torque can be provided to counteract the forces accelerating the motor vehicle 2 to reduce the vehicle speed to a value lower than a reference value. The magnitude of the reference value is representative of the fact that the motor vehicle 2 can then be stopped in a park mode of an automatic transmission of the motor vehicle 2. In other words, a two-stage deceleration may be provided, whereby first a vehicle speed is reduced to a value below the reference value by the traction motor, and then the motor vehicle 2 is stopped by a change to the park mode.

In particular, if the motor vehicle 2 comprises a combustion engine with an associated automatic transmission, the automatic transmission can be actuated with a further actuation signal AS' in such a way that the combustion engine is acting in opposition to the direction of motion, i.e. in order to stop a movement in the forward direction a reverse gear is selected and in the case of a movement in the reversing direction the first gear is selected. If on the other hand the motor vehicle 2 comprises an electric motor as a traction motor, a reversal of the direction of travel is carried out by a corresponding actuation of the electric motor.

If the motor vehicle 2 has been stopped or decelerated to a motor vehicle speed below the threshold, in a further step S400 the brake back-up system 8 can produce a control signal for switching to a park mode of an automatic transmission of the motor vehicle 2.

Alternatively, it may be provided that a clutch assembly of the drive train of the motor vehicle 2 will be actuated with the actuation signal AS in such a way that drive wheels of the motor vehicle 2 lock. Alternatively, a braking effect can be provided to stop the vehicle 2.

Thus, operating data BD of the motor vehicle 2 are read in and evaluated that are indicative of a failure of the braking system of the motor vehicle 2. If this is the case, selected components of the drive train are actuated to provide a braking effect in an alternative way to stop or bring the motor vehicle 2 to a halt. The safety of such a driver assistance system 6 can thus be increased.

REFERENCE CHARACTER LIST

2 motor vehicle
4 handheld device
6 driver assistance system
8 brake back-up system
AS actuation Signal
AS' actuation signal
BD operating data
S100 Step
S200 Step
S300 Step
S400 Step

The invention claimed is:

1. A method for operating a brake back-up system of a motor vehicle, the method comprising:
   reading in operating data of the motor vehicle,
   identifying, based on the reading of the in operating data, a malfunction of a braking system of the motor vehicle,
   providing, based on the malfunction of the braking system of the motor vehicle, an actuation signal to influence a component of a drive train of the motor vehicle, wherein the component comprises an automatic transmission configured to be actuated with a torque acting in opposition to a direction of motion of the motor vehicle to bring the vehicle to a standstill, and
   generating, based on the malfunction of the braking system, subsequent to providing the actuation signal, and based on detecting the standstill of the motor vehicle, a control signal to change to a park mode of an automatic gearbox of the motor vehicle.

2. The method as claimed in claim 1, wherein the component comprises a traction engine configured to be actuated with the actuation signal (AS) to provide a torque causing a standstill of the motor vehicle.

3. The method as claimed in claim 1, wherein the component comprises a clutch assembly configured to be actuated with the actuation signal (AS) to lock drive wheels of the motor vehicle.

4. The method as claimed in claim 1, wherein the malfunction comprises inadmissible data and/or a speed above a threshold.

5. The method as claimed in claim 1, wherein the operating data comprises data representative of brake control signals and/or of a motor vehicle speed.

6. A motor vehicle, comprising:
   a memory and a processor configured to:
   read in operating data of the motor vehicle,
   identify, based on the reading of the in operating data, a malfunction of a braking system of the motor vehicle,
   provide, based on the malfunction of the braking system of the motor vehicle, an actuation signal to influence a component of a drive train of the motor vehicle, wherein the component comprises an automatic transmission configured to be actuated with a torque acting in opposition to a direction of motion of the motor vehicle to bring the vehicle to a standstill, and
   generate, based on the malfunction of the braking system, subsequent to providing the actuation signal, and based on detecting the standstill of the motor vehicle, a control signal to change to a park mode of an automatic gearbox of the motor vehicle.

7. A brake back-up system for a motor vehicle, the brake back-up system comprising:
   a computer configured to:
   read in operating data of the motor vehicle,
   identify, based on the reading of the in operating data, a malfunction of a braking system of the motor vehicle,
   provide, based on the malfunction of the braking system of the motor vehicle, an actuation signal to influence a component of a drive train of the motor vehicle, wherein the component comprises an automatic transmission configured to be actuated with a torque acting in opposition to a direction of motion of the motor vehicle to bring the vehicle to a standstill, and generate, based on the malfunction of the braking system, subsequent to providing the actuation signal, and based on detecting the standstill of the motor vehicle, a control signal to change to a park mode of an automatic gearbox of the motor vehicle.

8. The brake back-up system as claimed in claim 7, wherein the component comprises a traction engine configured to be actuated by the actuation signal to provide a torque causing a standstill of the motor vehicle.

9. The brake back-up system as claimed in claim 7, wherein the component comprises a clutch assembly configured to be actuated the actuation signal to lock drive wheels of the motor vehicle.

10. The brake back-up system as claimed in claim 7, wherein the malfunction comprises inadmissible data and/or a vehicle speed above a threshold.

11. The brake back-up system as claimed in claim 7, wherein the operating date comprises data representative of brake control signals and/or of a vehicle speed.

* * * * *